United States Patent
Hakozaki

(10) Patent No.: US 9,813,581 B2
(45) Date of Patent: Nov. 7, 2017

(54) IMPROVING WORKFLOW PROCESSING EFFICIENCY OF INFORMATION PROCESSING SYSTEM, INFORMATION PROCESSING METHOD, AND DEVICE VIA WORKLOAD DISTRIBUTION

(71) Applicant: Hironori Hakozaki, Tokyo (JP)

(72) Inventor: Hironori Hakozaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/565,562

(22) Filed: Dec. 10, 2014

(65) Prior Publication Data

US 2015/0195422 A1 Jul. 9, 2015

(30) Foreign Application Priority Data

Jan. 7, 2014 (JP) ................................ 2014-001022

(51) Int. Cl.
*H04N 1/32* (2006.01)
*H04N 1/00* (2006.01)

(52) U.S. Cl.
CPC ....... *H04N 1/32507* (2013.01); *H04N 1/0092* (2013.01); *H04N 1/00228* (2013.01);
(Continued)

(58) Field of Classification Search
CPC ....... H04N 2201/0082; H04N 1/00228; H04N 1/00347; H04N 1/00912; H04N 1/0092;
(Continued)

(56) References Cited

U.S. PATENT DOCUMENTS 8,179,542 B2 5/2012 Yagi
8,881,160 B2 11/2014 Ozaki et al.
(Continued)

FOREIGN PATENT DOCUMENTS

EP 1947835 7/2008
JP H09-198357 7/1997
(Continued)

OTHER PUBLICATIONS

Extended European Search Report dated Nov. 12, 2015.
Japanese Office Action for 2014-001022 dated Sep. 12, 2017.

*Primary Examiner* — Iriana Cruz
(74) *Attorney, Agent, or Firm* — IPUSA, PLLC

(57) ABSTRACT

An information processing system including a device connected to an information processing apparatus is provided. The device includes an accepting unit that accepts a request for executing a set of process units defined by definition information with respect to data generated by the device, a first process control unit that controls execution of a part of the process units based on the definition information, and a transmitting unit that transmits to the information processing apparatus an execution result of the process unit controlled by the first process control unit and information indicating the process unit executed at the device. The information processing apparatus includes a receiving unit that receives the execution result and the information indicating the process unit executed at the device, and a second process control unit that controls execution of a process unit that has not been executed at the device based on the definition information.

12 Claims, 15 Drawing Sheets

| FLOW ID | PLUGIN ID | EXECUTION ORDER | EXECUTING LOCATION | STATUS | PARAMETER NAME | INPUT DATA | OUTPUT DATA | ... |
|---|---|---|---|---|---|---|---|---|
| F001 | Plug001 | 1 | DEVICE | UNPROCESSED | ... | Scan | | ... |
| | Plug002 | 2 | SERVER | UNPROCESSED | ... | Plug001 | | ... |
| | Plug003 | 3 | SERVER | UNPROCESSED | ... | Plug002 | | ... |

(52) U.S. Cl.
CPC ..... *H04N 1/00347* (2013.01); *H04N 1/00912* (2013.01); *H04N 1/00931* (2013.01); *H04N 1/32502* (2013.01); *H04N 1/32545* (2013.01); *H04N 2201/0082* (2013.01)

(58) Field of Classification Search
CPC ........... H04N 1/00931; H04N 1/32502; H04N 1/32545; H04N 1/32507; G06F 3/12
See application file for complete search history.

(56) References Cited

U.S. PATENT DOCUMENTS

| | | | |
|---|---|---|---|
| 2006/0136488 A1 | 6/2006 | Mifune et al. | |
| 2007/0147870 A1* | 6/2007 | Shindo | G03G 15/5012 399/82 |
| 2008/0052724 A1* | 2/2008 | Numata | H04N 1/00344 718/107 |
| 2008/0068638 A1* | 3/2008 | Yagi | G06F 17/30011 358/1.14 |
| 2008/0229306 A1 | 9/2008 | Omori | |
| 2008/0285073 A1 | 11/2008 | Sawayanagi et al. | |
| 2009/0046322 A1* | 2/2009 | Takahashi | G06F 3/122 358/1.16 |
| 2013/0070296 A1* | 3/2013 | Ishibashi | G06F 3/1207 358/1.15 |
| 2015/0081757 A1* | 3/2015 | Yagi | H04L 67/325 709/201 |
| 2015/0124288 A1* | 5/2015 | Tajima | G06F 3/1203 358/1.15 |

FOREIGN PATENT DOCUMENTS

| | | |
|---|---|---|
| JP | 2006-180289 | 7/2006 |
| JP | 2008-097586 | 4/2008 |
| JP | 2008-226182 | 9/2008 |
| JP | 2008-287608 | 11/2008 |
| JP | 2012-099030 | 5/2012 |

\* cited by examiner

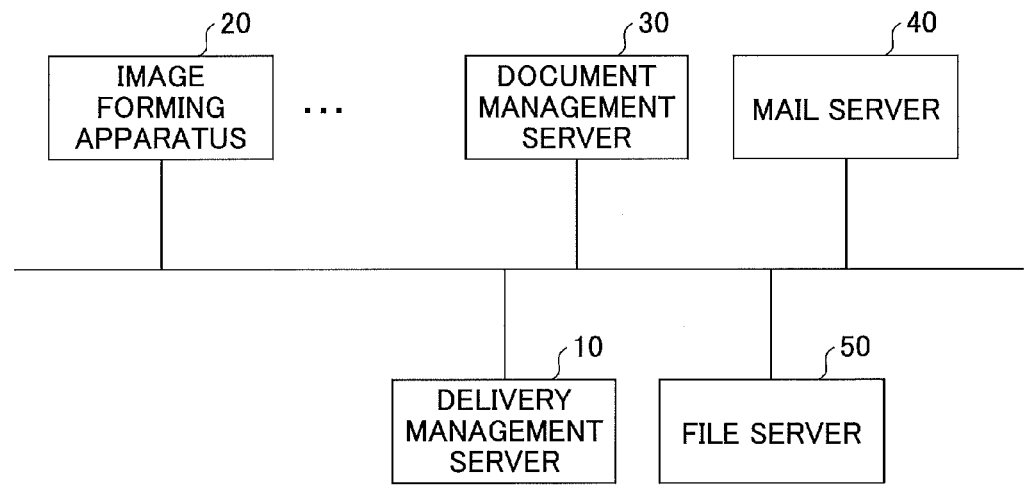
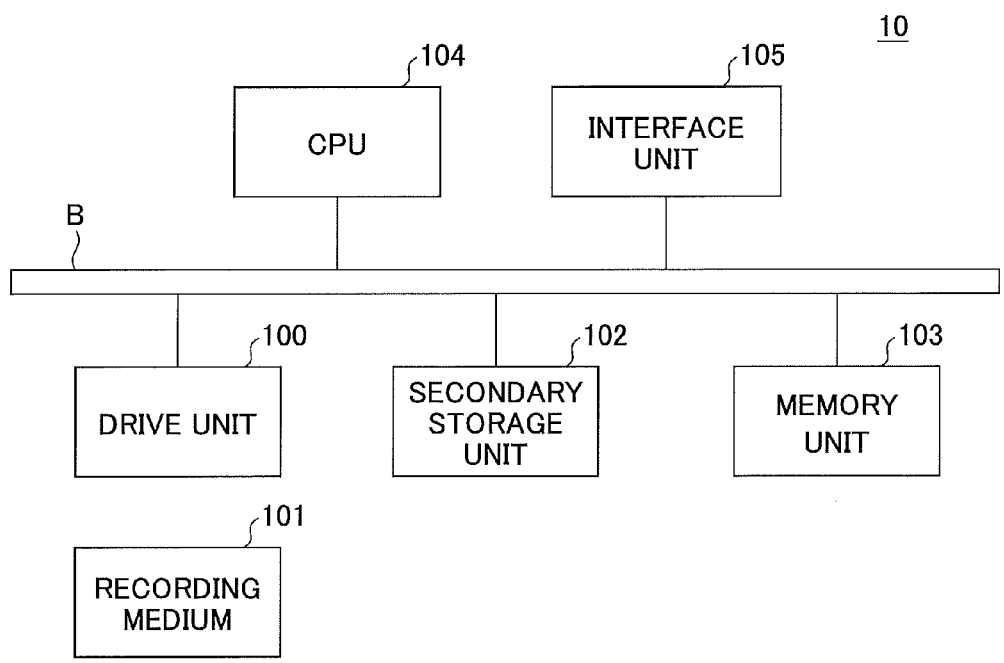

FIG.8

| FLOW ID | PLUGIN ID | EXECUTION ORDER | EXECUTING LOCATION | STATUS | PARAMETER NAME | INPUT DATA | OUTPUT DATA | ... |
|---|---|---|---|---|---|---|---|---|
| F001 | Plug001 | 1 | DEVICE | UNPROCESSED | ... | Scan | | ... |
| | Plug002 | 2 | SERVER | UNPROCESSED | ... | Plug001 | | ... |
| | Plug003 | 3 | SERVER | UNPROCESSED | ... | Plug002 | | ... |

IMPROVING WORKFLOW PROCESSING EFFICIENCY OF INFORMATION PROCESSING SYSTEM, INFORMATION PROCESSING METHOD, AND DEVICE VIA WORKLOAD DISTRIBUTION

BACKGROUND OF THE INVENTION

1. Field of the Invention

The present invention relates to an information processing system, an information processing method, and a device.

2. Description of the Related Art

Systems are known that are capable of executing a pre-defined workflow with respect to image data of a document scanned by an image forming apparatus (see e.g. Japanese Laid-Open Patent Publication No. 2008-97586). In such systems, a workflow is defined such that data may flow in accordance with operations of a user.

However, in the above system, the processing of the workflow is centrally executed by a computer that receives the image data from the image forming apparatus. Thus, for example, if the execution timing of a plurality of workflows to be executed with respect to scanned image data generated by a plurality of image forming apparatuses coincide with each other, the processing load on the computer may increase, and the processing efficiency of the workflow may be degraded.

SUMMARY OF THE INVENTION

In view of the above, an aspect of the present invention relates to improving the processing efficiency of a workflow to be executed with respect to data generated by a device.

According to one embodiment of the present invention, an information processing system including a device and an information processing apparatus that is connected to the device via a network is provided. The device includes an accepting unit configured to accept an execution request for executing an ordered set of a plurality of process units defined by definition information with respect to data generated by the device, a first process control unit configured to control execution of at least one process unit of the plurality of process units based on the definition information, and a transmitting unit configured to transmit to the information processing apparatus an execution result of the process unit controlled by the first process control unit and information indicating the process unit executed at the device. The information processing apparatus includes a receiving unit configured to receive the execution result of the process unit and the information indicating the process unit executed at the device, and a second process control unit configured to identify a process unit of the plurality of process units that has not been executed at the device based on the information indicating the process unit executed at the device and control execution of the identified process unit with respect to the execution result based on the definition information.

BRIEF DESCRIPTION OF THE DRAWINGS

FIG. 1 illustrates an exemplary configuration of a delivery management system according to a first embodiment of the present invention;

FIG. 2 illustrates an exemplary hardware configuration of a delivery management server according to the first embodiment;

FIG. 8 illustrates an exemplary configuration of flow definition data;

DESCRIPTION OF THE PREFERRED EMBODIMENTS

Figure 3:
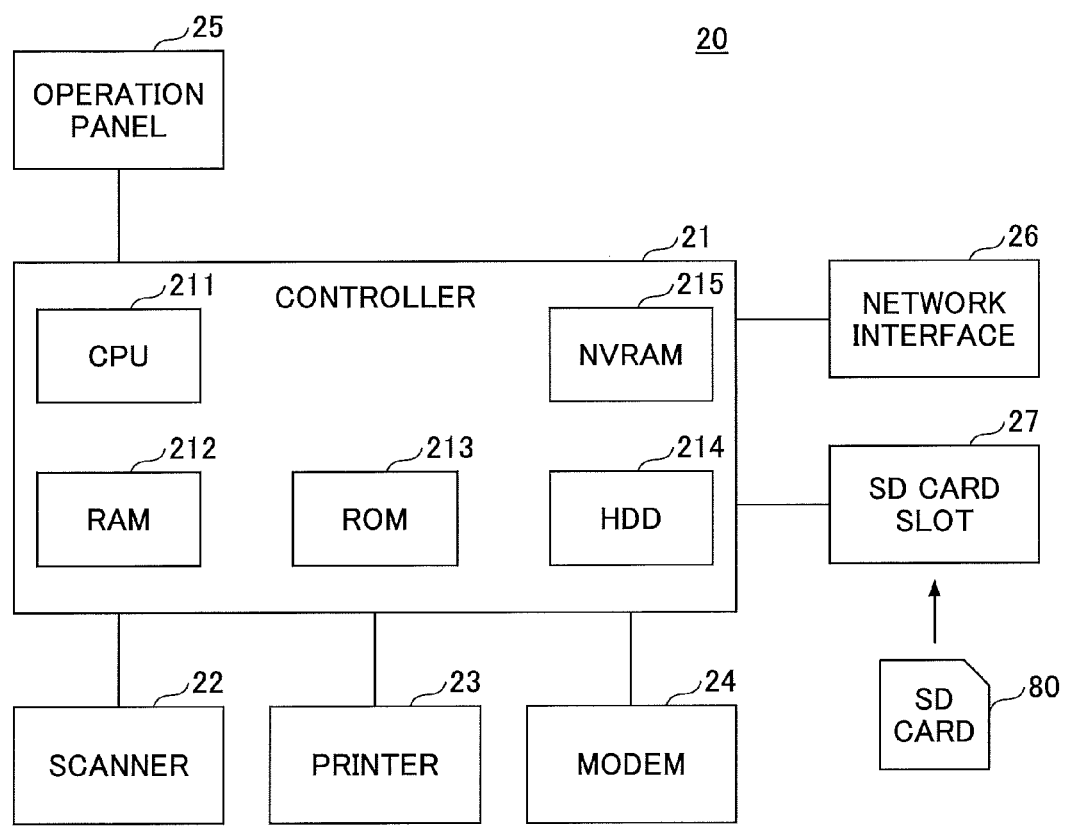
FIG. 3 illustrates an exemplary hardware configuration of an image forming apparatus according to the first embodiment.

In the following, embodiments of the present invention are described with reference to the accompanying drawings.

FIG. 1 illustrates an exemplary configuration of a delivery management system 1 according to a first embodiment of the present invention. In FIG. 1, the delivery management system 1 includes a delivery management server 10, at least one image forming apparatus 20, a document management server 30, a mail server 40, and a file server 50 that are interconnected by a network (which may be wired or wireless) such as a LAN (Local Area Network) or the Internet.

The image forming apparatus 20 is a device that generates image data based on information obtained by scanning a document. The delivery management server 10 is a computer that executes a pre-defined workflow with respect to image data generated by the image forming apparatus 20. Note that a workflow refers to a process flow implemented by an ordered set of one or more process units (tasks) that each realize a complete function independently or on their own. The process unit may correspond to an "activity" according to general workflow terminology. In the present embodiment, image data corresponds to data subject to processing by the workflow. Accordingly, process units of the workflow may include an OCR (optical character recognition) process for image data, a data conversion process for image data, and/or a delivery process for delivering data resulting from executing the OCR process or the data conversion process on image data, for example.

In the present embodiment, the image forming apparatus 20 is configured to execute one or more of the process units constituting a workflow.

The document management server 30, the mail server 40, and the file server 50 are examples of computers corresponding to delivery destination candidates of a delivery process, in a case where the workflow executed by the image forming apparatus 20 and the delivery management server 10 includes a delivery process. The document management server 30, may be a computer having a database for managing delivery data in association with corresponding attribute information, for example. In a case where the document management server 30 corresponds to the delivery destination, data delivered thereto may be stored in the database of the document management server 30, for example.

The mail server 40 is a computer that is configured to forward an email. In a case where the mail server 40 corresponds to the delivery destination, data delivered thereto may be attached to an email that is forwarded to an email address designated in the workflow, for example.

The file server 50 is a computer that stores and manages a file to be shared on the network. In a case where the file server 50 corresponds to the delivery destination, data delivered thereto may be stored in a folder of the file server 50, for example.

FIG. 2 is a diagram illustrating an exemplary hardware configuration of the delivery management server 10 according to the first embodiment. In FIG. 2, the delivery management server 10 includes a drive unit 100, a secondary storage unit 102, a memory unit 103, a central processing unit (CPU) 104, and an interface (I/F) unit 105 that are interconnected by a bus B.

A program that implements processes in the delivery management server 10 may be provided by a recording medium 101 such as a CD-ROM. When the recording medium 101 storing the program is loaded into the drive unit 100, the program may be installed in the secondary storage unit 102 from the recording medium 101 via the drive unit 100. The program, however, does not necessarily have to be installed from the recording medium 101, and may be downloaded from other computers via a network, for example. The secondary storage unit 102 stores files and data in addition to installed programs.

The memory unit 103 reads a program from the secondary storage unit 102 and stores the read program in response to an instruction to activate the program. The CPU 104 implements functions of the delivery management server 10 by executing a relevant program stored in the memory unit 103. The interface unit 105 is used as an interface for establishing connection with a network.

FIG. 3 illustrates an exemplary hardware configuration of the image forming apparatus 20 according to the first embodiment. In FIG. 3, the image forming apparatus 20 includes a controller 21, a scanner 22, a printer 23, a modem 24, an operation panel 25, a network interface 26, and an SD card slot 27 as hardware components.

The controller 21 includes a CPU 211, a random-access memory (RAM) 212, a read-only memory (ROM) 213, a hard disk drive (HDD) 214, and a nonvolatile RAM (NVRAM) 215. The ROM 213 stores various programs and data used by the various programs. The RAM 212 may be used as a storage area for loading a program or a work area for the loaded program. The CPU 211 implements various functions by executing programs loaded in the RAM 212. The HDD 214 stores programs and various types of data used by the programs. The NVRAM 215 stores various types of setting information.

The scanner 22 is hardware for scanning a document to obtain image data of the document. The printer 23 is hardware for printing out print data on a printing medium such as paper. The modem 24 is hardware for establishing connection with a telephone line and is used to execute image data transmission/reception by fax. The operation panel 25 may include an input unit such as a button for accepting an input from a user and a display unit such as a liquid crystal panel, for example. The liquid crystal panel may have a touch panel function, for example. In this case, the liquid crystal panel may also serve the function of an input unit. The network interface 26 is hardware for establishing connection with a network (which may be wired or wireless) such as a LAN. The SD card slot 27 is used to read a program stored in an SD card 80. That is, in the image forming apparatus 20 of the present embodiment, a program stored in the SD card 80 may be loaded in the RAM 212 and executed as well as a program stored in the ROM 213. Note that in some embodiments, the SD card 80 may be replaced by some other recording medium such as a CD-ROM, or a USB (Universal Serial Bus) memory, for example. That is, the recording medium storing a program that may be loaded in the RAM 212 is not limited to a certain type of recording medium. Note that in the case where the SD card 80 is replaced by some other type of recording medium, the SD card slot 27 may be replaced by hardware corresponding to the type of recording medium used.

Figure 4:
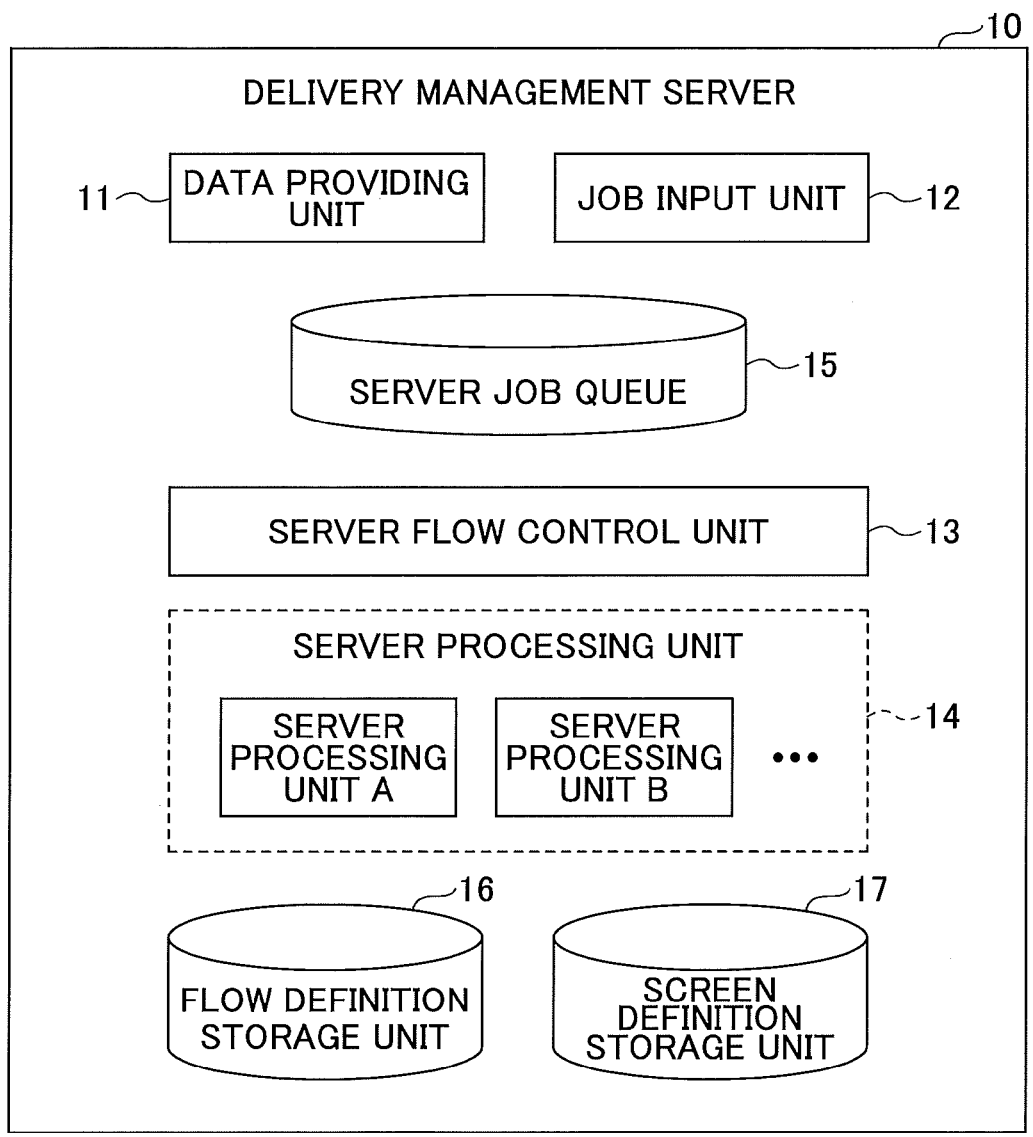
FIG. 4 illustrates an exemplary functional configuration of the delivery management server according to the first embodiment.

FIG. 4 illustrates an exemplary functional configuration of the delivery management server 10 according to the first embodiment. In FIG. 4, the delivery management server 10 includes a data providing unit 11, a job input unit 12, a server flow control unit 13, and a server processing unit 14. Note that each of these functional units may be implemented by the CPU 104 executing a relevant program that is installed in the delivery management server 10, for example. The delivery management server 10 also includes storage units such as a server job queue 15, a flow definition storage unit 16, and a screen definition storage unit 17. Each of these storage units may be implemented using the secondary storage unit 102 or a storage device connected to the delivery management server 10 via a network, for example. Note that the server job queue 15 may also be implemented using the memory unit 103, for example.

The flow definition storage unit 16 stores flow definition data. Flow definition data refers to editable data recording definition information relating to a process flow of a workflow. In the present embodiment, one set of flow definition data corresponds to one workflow. Each set of flow definition data includes a flow ID corresponding to identification information for identifying the workflow.

The screen definition storage unit 17 stores screen definition data. Screen definition data refers to data recording configuration information of a screen for accepting an input of setting values for a workflow. In the present embodiment, one set of screen definition data corresponds to one workflow; namely, one set of flow definition data. For example, the screen definition data may be stored in association with the flow definition data of the corresponding workflow. In the present embodiment, the flow definition data includes a record of identification information identifying the corresponding screen definition data (hereinafter referred to as "screen ID"), and in this way, the flow definition data and the screen definition data may be associated with each other.

The data providing unit 11 provides data such as screen definition data and flow definition data to the image forming apparatus 20. The job input unit 12 receives job information of a workflow transmitted from the image forming apparatus 20, and registers the job information in the server job queue 15. In the present embodiment, a job refers to a discrete workflow execution event. For example, even if the same workflow is executed multiple times, the job is different each time. Job information refers to information relating to a job. For example, the job information transmitted from the image forming apparatus 20 may include scanned image data, flow definition data of a workflow to be executed, setting values for parameters of the workflow, and output data generated by process units executed by the image forming apparatus 20 of the process units constituting the workflow.

The server job queue 15 may store job information in a FIFO (First-In First-Out) format, for example. The server flow control unit 13 acquires the job information stored in the server job queue 15, and based on the workflow definition data included in the acquired job information, controls execution of process units (activities) to be executed at the delivery management server 10 of the process units constituting the workflow.

The server processing unit 14 executes a process unit (activity) to be executed at the delivery management server 10 of the process units constituting the workflow. For example, one server processing unit 14 may be configured to execute one activity. That is, a workflow may be implemented by a series of connected processes executed by one or more server processing units 14 each configured to execute a different process, for example. In FIG. 4, a server processing unit A and a server processing unit B are illustrated as examples of the server processing unit 14. Note that each server processing unit 14 may be implemented by an independent program module, for example. In this case, each program module may be a plugin program that can be easily installed in the delivery management server 10, for example.

Figure 5:
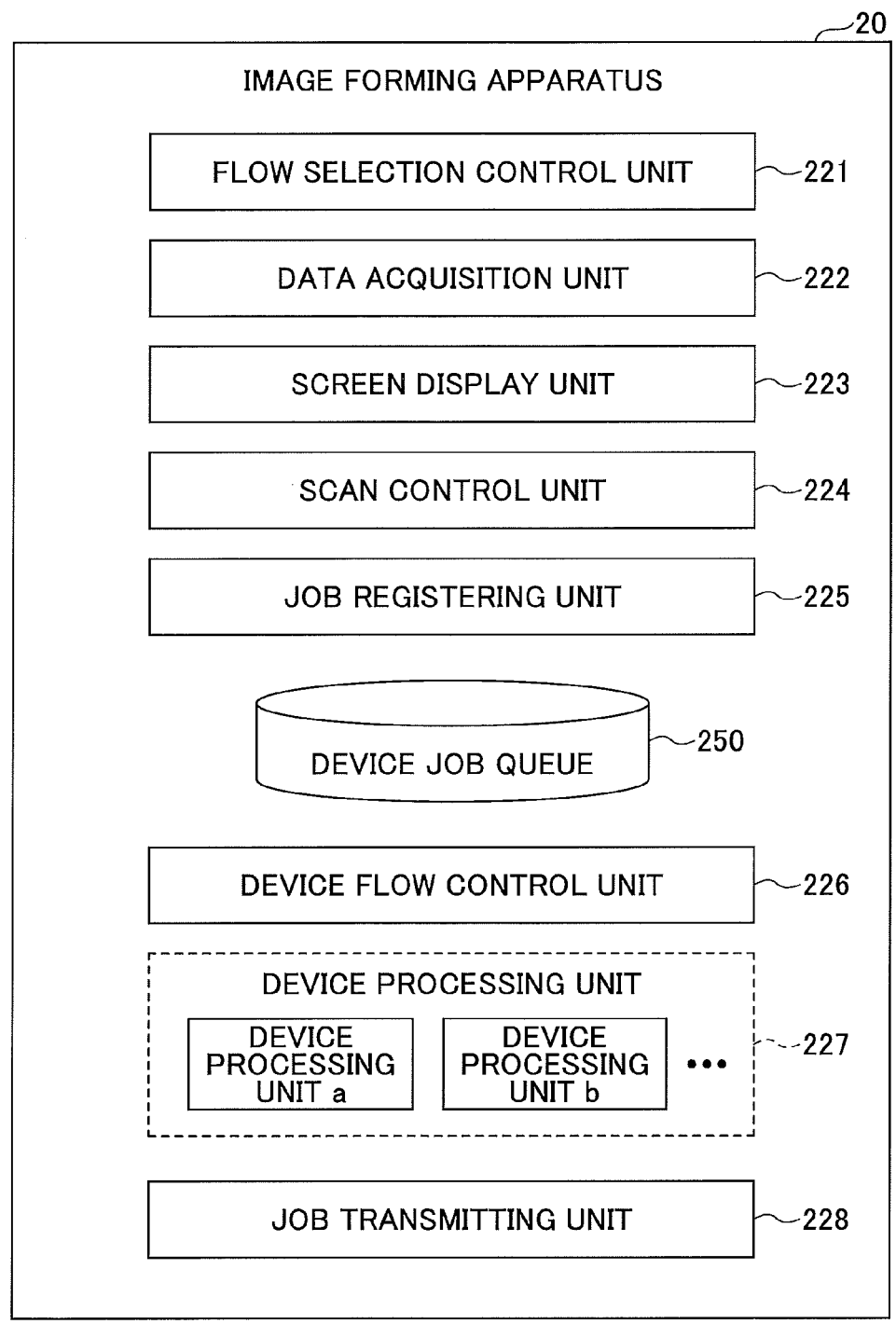
FIG. 5 illustrates an exemplary functional configuration of the image forming apparatus according to the first embodiment.

FIG. 5 illustrates an exemplary functional configuration of the image forming apparatus 20 according to the first embodiment. In FIG. 5, the image forming apparatus 20 includes a flow selection control unit 221, a data acquisition unit 222, a screen display unit 223, a scan control unit 224, a job registering unit 225, a device flow control unit 226, a device processing unit 227, and a job transmitting unit 228. Note that each of these functional units may be implemented by the CPU 211 executing a relevant program that is installed in the image forming apparatus 20, for example. The image forming apparatus 20 also includes a device job queue 250. The device job queue 250 may be implemented using the RAM 112 or the HDD 114, for example.

The flow selection control unit 221 controls a process of accepting a selection of a workflow to be executed from a user. The data acquisition unit 222 acquires the screen definition data and the flow definition data of the workflow to be executed (hereinafter referred to as "target flow") from the delivery management server 10. The screen display unit 223 prompts the operation panel 25 to display a screen for accepting an input of a setting value for a parameter of the target flow (hereinafter referred to as "parameter input screen") based on the acquired screen definition data. The scan control unit 224 controls a process of scanning a document to obtain scanned image data of the document. The job registering unit 225 registers job information of the target flow including the scanned image data in the device job queue 250. The device job queue 250 may store job information in a FIFO (First-In First-Out) format, for example. The device flow control unit 226 acquires the job information stored in the device job queue 250, and controls execution of one or more process units to be executed at the image forming apparatus 20 of the process units constituting the workflow based on the flow definition data included in the acquired job information. That is, the workflow is started by the device flow control unit 226.

The device processing unit 227 executes a process unit (activity) to be executed at the image forming apparatus 20 of the process units constituting the workflow. For example, one device processing unit 227 may be configured to execute one activity. In this case, the workflow may be implemented by a series of connected processes executed by one or more device processing units 227 each configured to execute a different process, for example. In FIG. 5, a device processing unit a and a device processing unit b are illustrated as example of the device processing unit 227. Note that each device processing unit 227 may be implemented by an independent program module, for example. In this case, each program module may be a plugin program that can be easily installed in the image forming apparatus 20, for example. Note that in some embodiments, the device processing unit 227 and the server processing unit 14 may have overlapping functions. That is, the device processing unit 227 may include a device processing unit that is configured to implement the same function as a server processing unit of the server processing unit 14, for example.

The job transmitting unit 228 transmits to the delivery management server 10 job information including execution results of the process units executed at the image forming apparatus 20 of the process units constituting the target flow.

In the following, process steps executed in the delivery management system 1 of the present embodiment are described.

Figure 6:
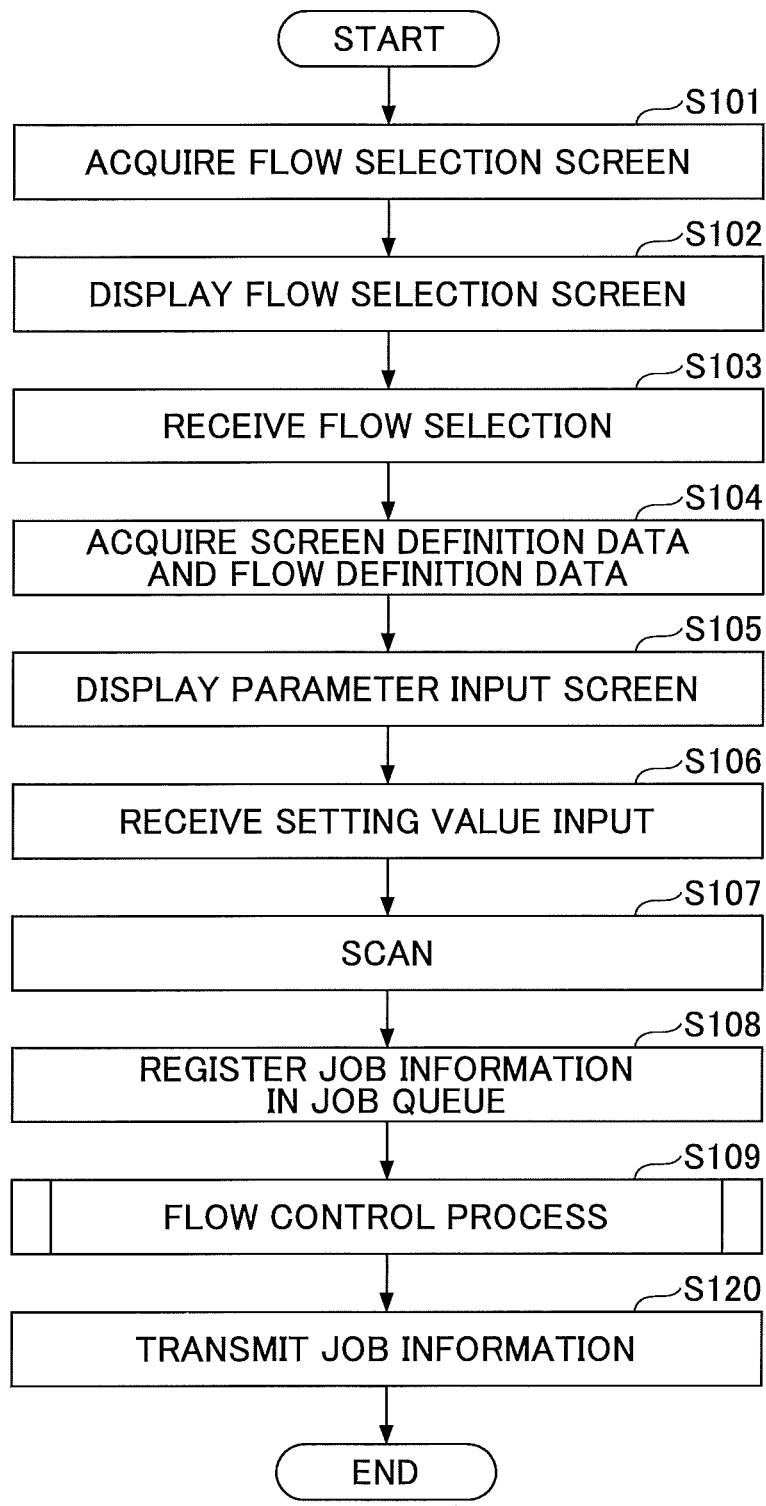
FIG. 6 is a flowchart illustrating exemplary process steps executed by the image forming apparatus upon executing a workflow according to the first embodiment.

FIG. 6 is a flowchart illustrating exemplary process steps executed by the image forming apparatus 20 upon executing a workflow according to the first embodiment. Note that in the following descriptions, it is assumed that a user operating the image forming apparatus 20 has been authenticated by the image forming apparatus 20 before executing the process steps of FIG. 6. For example, a user name and a password may be input via a login screen displayed on the operation panel 25 of the image forming apparatus 20 and an authentication process may be performed with respect to the input user name and password. Note that in some embodiments, the execution of the authentication process may be delegated to an authentication server (not shown), for example. Upon successful authentication, the image forming apparatus 20 stores the user name of the authenticated user as a "login user name".

When a predetermined operation is performed by the user who has successfully logged into the image forming apparatus 20, the flow selection control unit 221 acquires screen data of a flow selection screen from the delivery management server (step S101). The flow selection screen is a screen for selecting a target flow from a list of workflows having corresponding flow definition data stored in the flow definition storage unit 16. Note that identification information such as the IP address of the delivery management server 10 may be set up in advance in the image forming apparatus 20, for example.

Then, the flow selection control unit 221 prompts the operation panel 25 of the image forming apparatus 20 to display the flow selection screen based on the acquired screen data (step S102). The flow selection screen may display a button for each workflow (each set of flow definition data), for example.

When one of the buttons in the flow selection screen is selected (step S103), the data acquisition unit 222 acquires screen definition data and flow definition data corresponding to the flow ID associated with the selected button (hereinafter referred to as "target flow ID") from the delivery management server 10 (step S104). That is, the selection of a button corresponds to one example of a workflow execution request. The data acquisition unit 222 transmits a data acquisition request including the target flow ID to the delivery management server 10. In turn, the data providing unit 11 of the delivery management server 10 returns a duplicate of the screen definition data stored in the screen definition storage unit 17 and a duplicate of the flow definition data stored in the flow definition storage unit 16 that are associated with the target flow ID included in the data acquisition request to the image forming apparatus 20. Note that in the following, the above duplicates of the screen definition data and the flow definition data are respectively referred to as "target screen definition data" and "target flow definition data".

Then, based on the target screen definition data, the screen display unit 223 displays a parameter input screen for the target flow associated with the target flow ID on the operation panel 25 (step S105). Note that parameters may be different for each workflow.

Then, the screen display unit 223 accepts inputs of setting values for the parameters from the user via the parameter input screen (step S106). Then, the scan control unit 224 scans a document set by the user (step S107). The job registering unit 225 registers job information including the login user name, the target flow definition data, the scanned image data of the document (hereinafter referred to as "scanned image"), and the input setting values, for example, in the device job queue 250 (step S108).

Then, the device flow control unit 226 executes a target flow control process (step S109). In the target flow control process, process units to be executed at the image forming apparatus 20 of the process units constituting the target flow are successively executed in the designated order defined in the target flow definition data. Note that as the process units are executed, data output as execution results of the executed process units (hereinafter referred to as "output data") may be added to the job information. However, in some embodiments, data added to the job information may be limited to output data of the last executed process unit of the process units that are executed at the image forming apparatus 20, for example.

When the execution of the process units to be executed at the image forming apparatus 20 is completed, the job transmitting unit 228 transmits the job information to the delivery management server (step S120). The transmitted job information includes the login user name, the target flow definition data, the scanned image, the input setting values, as well as the output data of each process unit that has been executed at the image forming apparatus 20, or the output data of the last executed process unit.

Figure 7:
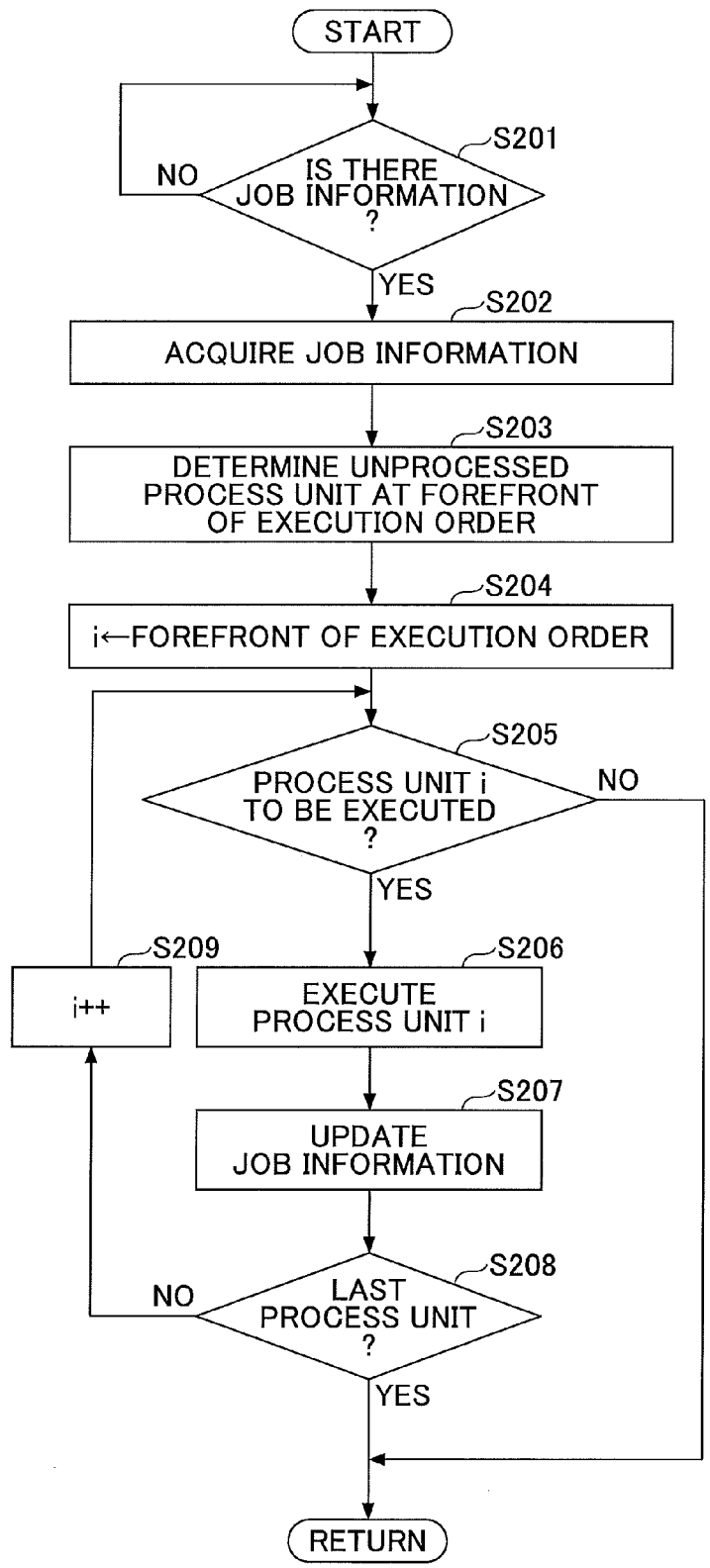
FIG. 7 is a flowchart illustrating exemplary process steps of a workflow control process according to the first embodiment.

In the following, step S109 is described in greater detail. FIG. 7 is a flowchart illustrating exemplary process steps of a workflow control process according to the first embodiment.

The device flow control unit 226 may refer to the device job queue 250 at predetermined time intervals, for example (step S201). If job information is stored in the device job queue 250 (YES in step S201), the device flow control unit 226 acquires the job information (step S202). Then, based on the target flow definition data included in the job information, the device flow control unit 226 identifies a process unit at the forefront of the execution order from unprocessed process units of the target flow (step S203).

FIG. 8 is a table illustrating an exemplary configuration of the flow definition data. In FIG. 8, an example of flow definition data for one workflow is illustrated.

In FIG. 8, the flow definition data includes a flow ID of the workflow. Also, the flow definition data includes a record for each process unit constituting the workflow (hereinafter referred to as "plugin record"). Each plugin record includes a corresponding value for each information item such as a plugin ID, an execution order, an executing location, a status, a parameter name, input data, and output data, for example.

The plugin ID is identification information of a plugin program for prompting the image forming apparatus 20 or the delivery management server 10 to execute a process unit. The execution order is information indicating the execution order of the process unit. The executing location is information indicating the location where the process unit is to be executed. That is, the executing location is specified as "device" or "server". "Device" indicates that the process unit is to be executed at the image forming apparatus 20. "Server" indicates that the process unit is to be executed at the delivery management server 10. The status is information indicating whether the process unit has been executed. A status specified as "unprocessed" indicates that the process unit has not yet been executed. A status specified as "processed" indicates that the process unit has been executed. The parameter name is the name of a parameter for the process unit. The parameter name may identify the corresponding plugin program for which a setting value is entered via a parameter input screen, for example. A value specified as the input data of the flow definition data indicates an input source of data to be processed by the process unit. The plugin ID of a process unit that outputs the input data to be processed by the process unit is usually specified as the input data. Note, however, that if the scanned image corresponds to the input data, "scan" is specified as the input data. A value specified as the output data of the flow definition data indicates the pathname of a file that stores the output data of the process unit. Note that the output data may be recorded after the process unit is executed, or the output data may be defined in advance.

As described above, the flow definition data includes information items such as the status and the output data that may be recorded in conjunction with the progress of the workflow, for example. However, in some embodiments, such information items may be managed as separate data from the flow definition data. Also, the flow definition data may be described in any suitable format such as the XML (eXtensible Markup Language) format, for example.

In step S203, the device flow control unit 226 identifies the process unit at the forefront of the execution order from the process units having the value "unprocessed" specified as their status information.

Then, the device flow control unit 226 assigns the execution order of the identified process unit to a variable "i" (step S204). The variable "i" is a variable identifying the execution order of a process unit. In the following, the process unit having its execution order associated with the variable "i" is referred to as "process unit i".

Then, the device flow control unit 226 determines whether the process unit i should be executed (step S205). That is, the device flow control unit 226 determines whether "device" is specified as the value of the executing location in the target flow definition data of the process unit i.

If the processing unit i is not to be executed; that is, when "server" is specified as the value of the executing location of the process unit i (NO in step S205), the process of FIG. 7 returns to the process of FIG. 6. If the process unit i is to be executed; that is, when "device" is specified as the value of the executing location of the process unit i (YES in step S205), the device flow control unit 226 controls execution of the process unit i by the corresponding device processing unit 227 that is configured to execute the process unit i (step S206). That is, based on the value specified as the input data in the flow definition data for the process unit i, the device flow control unit 226 arranges corresponding data to be input to the corresponding device processing unit 227 that is to execute the processing unit i. Note that the corresponding device processing unit 227 that is configured to execute the process unit i may be identified based on the plugin ID of the process unit i specified in the target flow definition data.

When the process unit i is properly executed, the device flow control unit 226 updates the job information (step S207). Specifically, the output data (execution result) of the executed process unit i is added to the job information. Also, with respect to the target flow definition data, the device flow control unit 226 updates the status of the process unit i from "unprocessed" to "processed". Further, the device flow control unit 226 records the pathname of the file storing the output data of the process unit i as the value for the output data of the process unit i in the target flow definition data.

Then, the device flow control unit 226 determines whether the executed process unit i is the last process unit to be executed according to the execution order of the target flow (S208). In other words, the device flow control unit 226 determines whether execution control of the process units of the target flow has been completed.

If the executed process unit i is not the last process unit according to the execution order of the target flow, (NO in step S208), the device flow control unit 226 adds 1 to the variable i (step S209) and repeats the process steps from step S205. If the executed process unit i is the last process unit according to the execution order of the target flow (YES in step S208), the process of FIG. 7 returns to the process of FIG. 6.

By implementing the flow control process of FIG. 7, the process units to be executed at the image forming apparatus 20 of the process units constituting the target flow may be executed.

Figure 9:
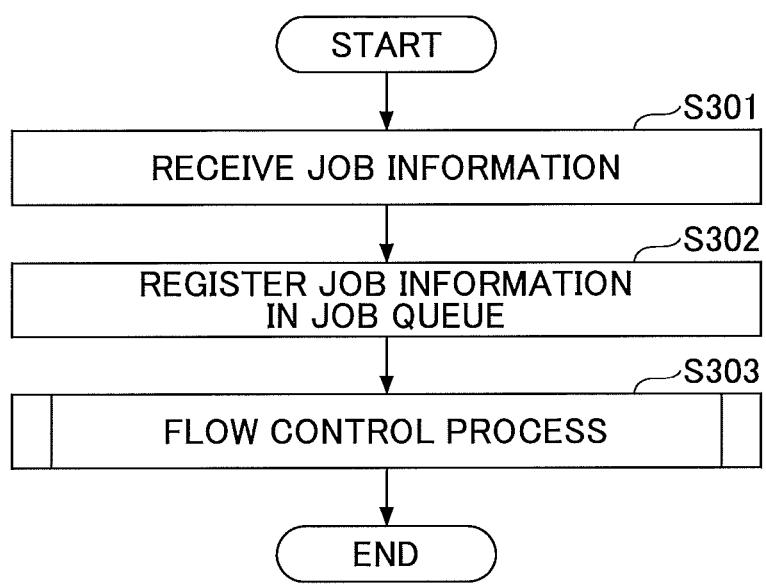
FIG. 9 is a flowchart illustrating exemplary process steps executed by the delivery management server upon executing a workflow according to the first embodiment.

In the following, process steps executed by the delivery management server 10 are described. FIG. 9 is a flowchart illustrating exemplary process steps executed by the delivery management server 10 upon executing a workflow according to the first embodiment.

In step S301, the job input unit 12 receives the job information transmitted from the image forming apparatus 20. The job input unit 12 may update the flow definition data included in the job information upon receiving the job information. For example, the job input unit 12 may replace the value of the output data in the flow definition data with a pathname of a file storing the output data within the delivery management server 10. Then, the job input unit 12 registers the job information in the server job queue 15 (step S302).

Then, the server flow control unit 13 executes a target flow control process (step S303). The process steps of the target flow control process executed in step S303 may be similar to the process steps described above in connection with FIG. 7, for example. However, the target flow control process is executed by the server flow control unit 13 in the present case. Also, process steps involving the device processing unit 227 are replaced by process steps involving the server processing unit 14.

As described above, according to the first embodiment, a part of the process units constituting a workflow may be executed at the image forming apparatus 20. In this way, the processing load of the delivery management server 10 may be reduced, for example. As a result, processing efficiency may be improved upon executing workflows with respect to multiple scanned images scanned by multiple image forming apparatuses 20, for example.

Note that when the delivery management server 10 is configured by multiple computers, the process units to be executed at the delivery management server 10 may be distributed to and executed at multiple computers, for example.

In the following, a second embodiment of the present invention is described. Note that the descriptions below relate to features of the second embodiment that are different from those of the first embodiment. Therefore, it may be assumed that features not specifically mentioned below may be substantially similar to those of the first embodiment.

Figure 10:
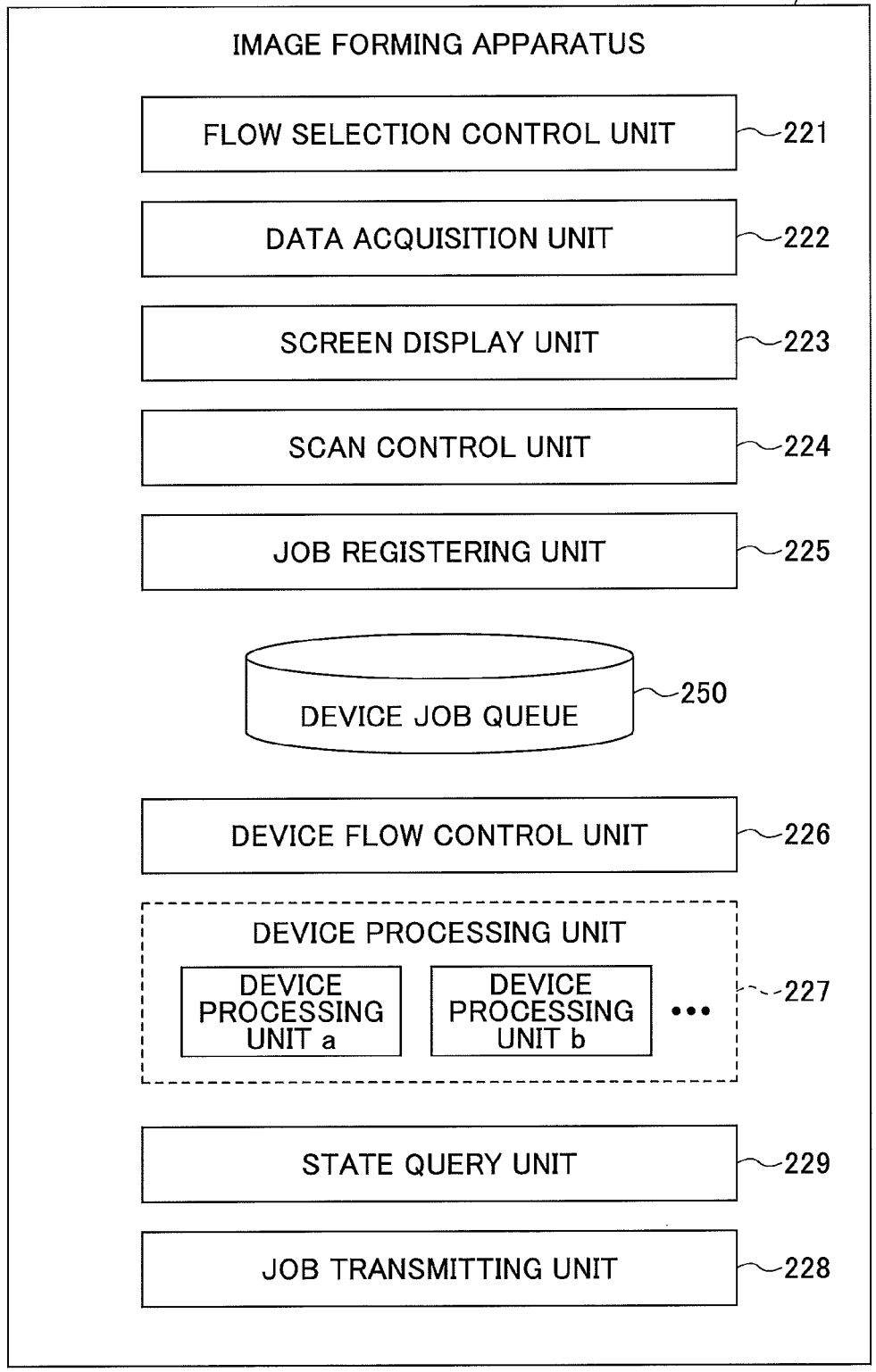
FIG. 10 illustrates an exemplary functional configuration of an image forming apparatus according to a second embodiment of the present invention.

FIG. 10 illustrates an exemplary functional configuration of an image forming apparatus 20 according to the second embodiment. In FIG. 10, the image forming apparatus 20 further includes a state query unit 229. The state query unit 229 makes a query regarding the state of the delivery management server 10. The state of the delivery management server 10 mainly relates to the processing load of the delivery management server 10. Information indicating the processing load of the delivery management server 10 may include information indicating the use rate of the CPU 104, for example. Also, the information indicating the processing load may including information indicating the number of job information items stored in the server job queue (i.e. the number of jobs in queue), for example. The information indicating the processing load of the delivery management server 10 may also include other types of information as well. Note that the state query unit 229 may be implemented by the CPU 211 executing a relevant program installed in the image forming apparatus 20, for example.

In the second embodiment, the device flow control unit 226 may change the process unit to be executed at the image forming apparatus 20 depending on a query result obtained by the state query unit 229.

Figure 11:
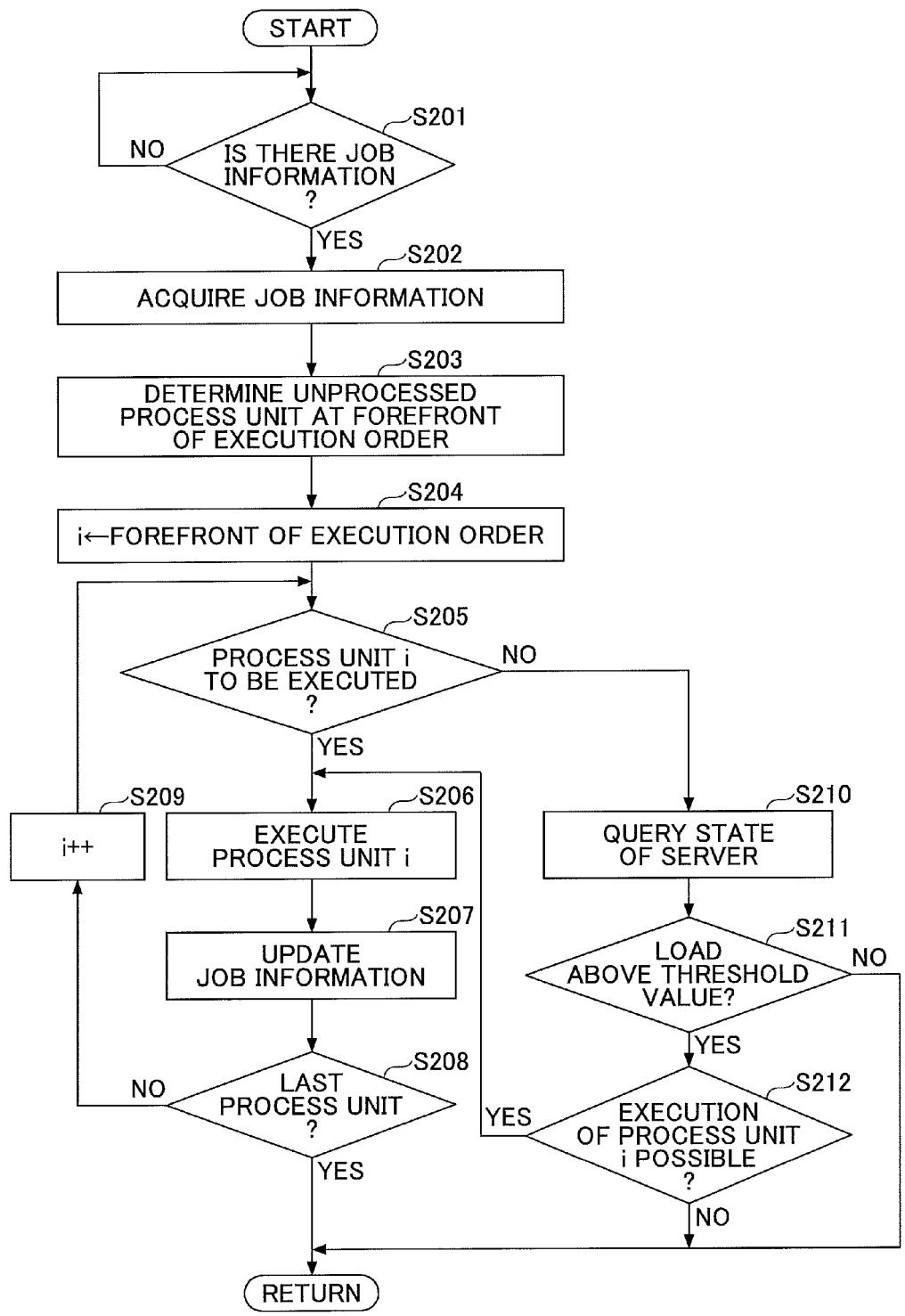
FIG. 11 is a flowchart illustrating exemplary process steps of a workflow control process according to the second embodiment.

FIG. 11 is a flowchart illustrating exemplary process steps of a workflow control process according to the second embodiment. According to the second embodiment, in step S109 of FIG. 6, the device flow control unit 226 executes the process steps as illustrated in FIG. 11 in place of the process steps illustrated in FIG. 7.

In FIG. 11, when the process unit i does not correspond to a process unit to be executed (NO in step S205), steps S210-S212 are executed as described below.

In step S210, the state query unit 229 makes a query regarding the state of the delivery management server 10 (step S210). Specifically, the state query unit 229 sends a state query request to the delivery management server 10. In response to receiving the state query request, the delivery management server 10 returns information indicating the state of the delivery management server 10 (hereinafter referred to as "state information") to the image forming apparatus 20.

Then, the device flow control unit 226 determines whether the processing load of the delivery management server 10 represented by the state information is greater than or equal to a predetermined threshold value (step S211). For example, the device flow control unit 226 may determine whether the use rate of the CPU 104 is greater than or equal to a predetermined rate of a %. Alternatively, the device flow control unit 226 may determine whether the number of jobs in queue is greater than or equal to a predetermined number β. Also, the device flow control unit 226 may make both of the above determinations, for example. In the case where both of the above determinations are made by the device flow control unit 226, an affirmative determination (YES in step S211) may be obtained when the processing load is determined to be greater than or equal to a predetermined threshold value in both of the above determinations, or an affirmative determination may be obtained when the processing load is determined to be greater than or equal to a predetermined threshold value in at least one of the above determinations.

If the processing load is less than the threshold value (NO in step S211), the flow control process of FIG. 11 returns to the process of FIG. 6. If the processing load is greater than or equal to the threshold value (YES in step S211), the device flow control unit 226 determines whether the image forming apparatus 20 is capable of executing the process unit i (step S212). For example, the device flow control unit 226 may determine whether a plugin program for executing the processing unit i is installed in the image forming apparatus 20.

If the image forming apparatus 20 is not capable of executing the process unit i (NO in step S212), the flow control process of FIG. 11 returns to the process of FIG. 6. If the image forming apparatus 20 is capable of executing the process unit i (YES in step S212), step S206 and subsequent process steps are executed with respect to the process unit i.

Note that according to the second embodiment, in step S303 of FIG. 9, the server flow control unit 13 executes process steps substantially similar to those illustrated in FIG. 7.

As described above, according to the second embodiment, execution of process units constituting a workflow may be dynamically controlled and changed such that even process units that are set up to be executed at the "server" may be controlled to be executed at the image forming apparatus 20 depending on the processing load of the delivery management server 10. As a result, processing efficiency of the workflow may be improved.

In the following, a third embodiment of the present invention is described. Note that the descriptions below relate to features of the third embodiment that are different from those of the first embodiment. Accordingly, it may be assumed that features of the third embodiment that are not particularly mentioned below may be substantially identical to those of the first embodiment.

Figure 12:
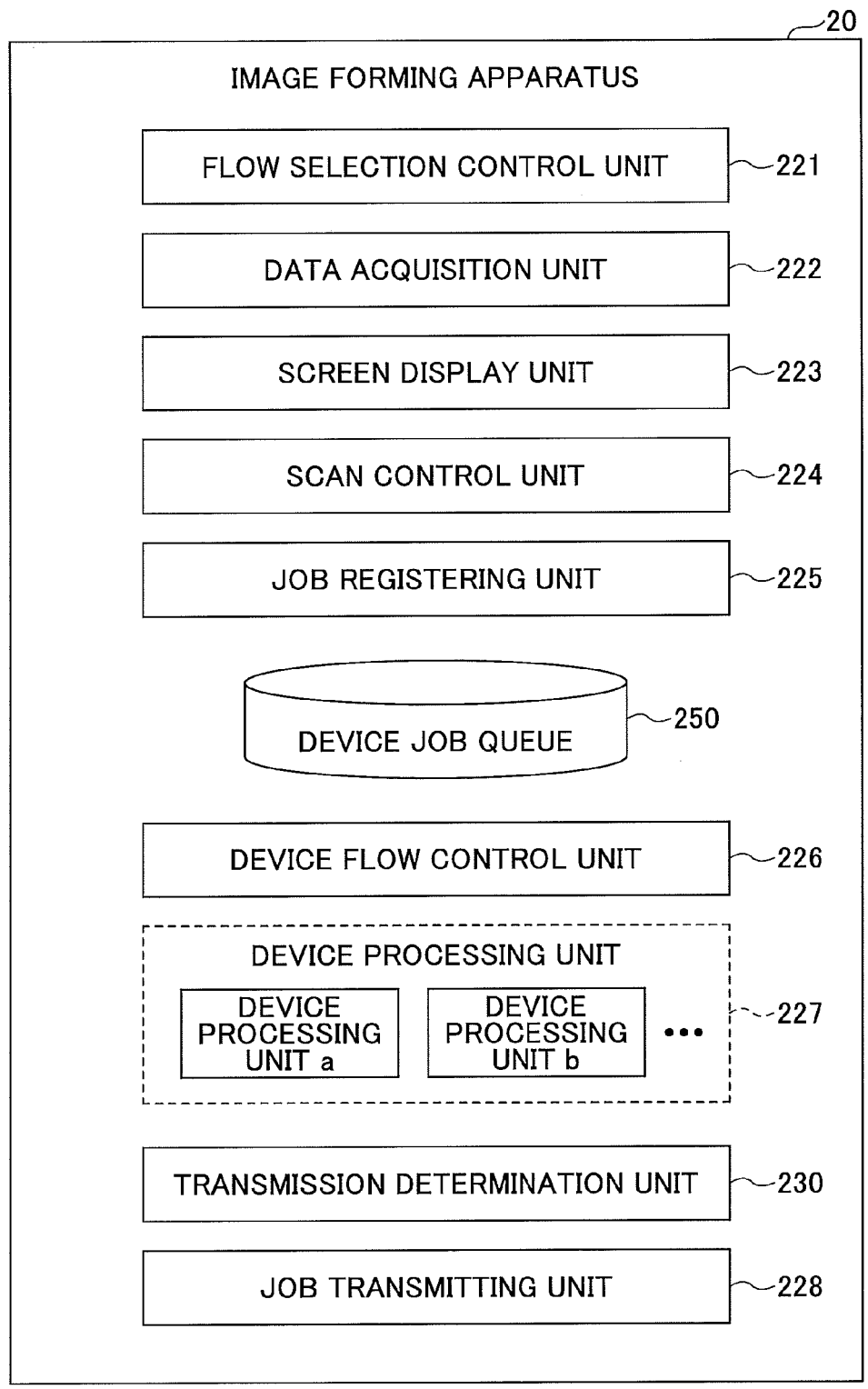
FIG. 12 illustrates an exemplary functional configuration of an image forming apparatus according to a third embodiment of the present invention.

FIG. 12 illustrates an exemplary functional configuration of an image forming apparatus according to the third embodiment of the present invention. In FIG. 12, the image forming apparatus 20 further includes a transmission determination unit 230. The transmission determination unit 230 identifies data that has to be transmitted to the delivery management server 10 from the job information that is to be transmitted to the delivery management server 10. The transmission determination unit 230 may be implemented by the CPU 211 executing a relevant program installed in the image forming apparatus 20, for example.

Figure 13:
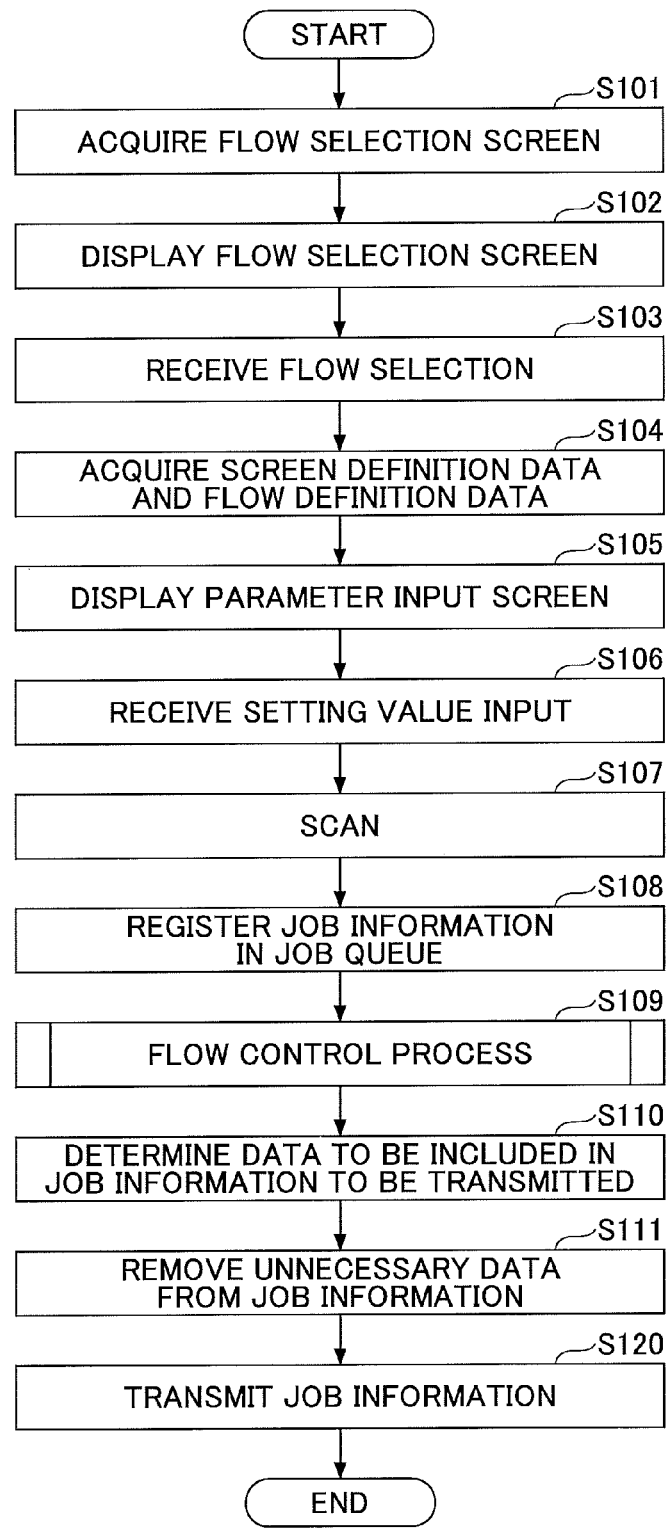
FIG. 13 is a flowchart illustrating exemplary process steps executed by the image forming apparatus upon executing a workflow according to the third embodiment.

FIG. 13 is a flowchart illustrating exemplary process steps executed by the image forming apparatus 20 according to the third embodiment upon executing a workflow. In the third embodiment, the image forming apparatus 20 executes the process steps illustrated in FIG. 13 in place of the process steps illustrated in FIG. 6.

In FIG. 13, after step S109, steps S110 and S111 are executed. In step S110, the transmission determination unit 230 identifies data required by the delivery management server 10 (i.e. data that has to be transmitted to the delivery management server 10) included in the job information. The job information may include data such as the scanned image and the output data of each process unit, for example. Based on the target flow definition data, the transmission determination unit 230 identifies the processing units having the value "server" specified as the executing location, and identifies data designated as the input data for these process units as the data required by the delivery management server 10. For example, with respect to the flow definition data as illustrated in FIG. 8, the output data of the process unit having the value "1" specified as the execution order is designated as the input data for the process unit having the value "2" specified as the execution order. In this case, the output data of the process unit having the value "1" specified as the execution order is identified as data that has to be transmitted to the delivery management server 10. In other words, the transmission determination unit 230 determines that the scanned image is not subject to processing by a process unit to be executed at the delivery management server 10 such that the scanned image does not have to be transmitted to the delivery management server 10.

Then, the transmission determination unit 230 removes unnecessary data from the job information (step S111). As a result, transmission of data unnecessary for the execution of the process units to be executed at the delivery management server 10 can be avoided in step S120.

As described above, according to the third embodiment, the amount of data included in the job information transmitted from the image forming apparatus 20 to the delivery management server 10 may be reduced. As a result, the network load of the delivery management system 1 may be reduced.

Note that in some embodiments, the third embodiment may be combined with the second embodiment. In this case, in step S110, the transmission determination unit 230 may identify process units having the value "server" specified as the executing location and having the value "unprocessed" specified as the status in the target flow definition data, and identify data designated as the input data for these process units as data that has to be transmitted to the delivery management server 10, for example.

In the following, a fourth embodiment of the present invention is described. Note that the descriptions below relate to features of the fourth embodiment that are different from those of the first embodiment. Accordingly, it may be assumed that features of the fourth embodiment that are not specifically mentioned below may be substantially similar to those of the first embodiment.

Figure 14:
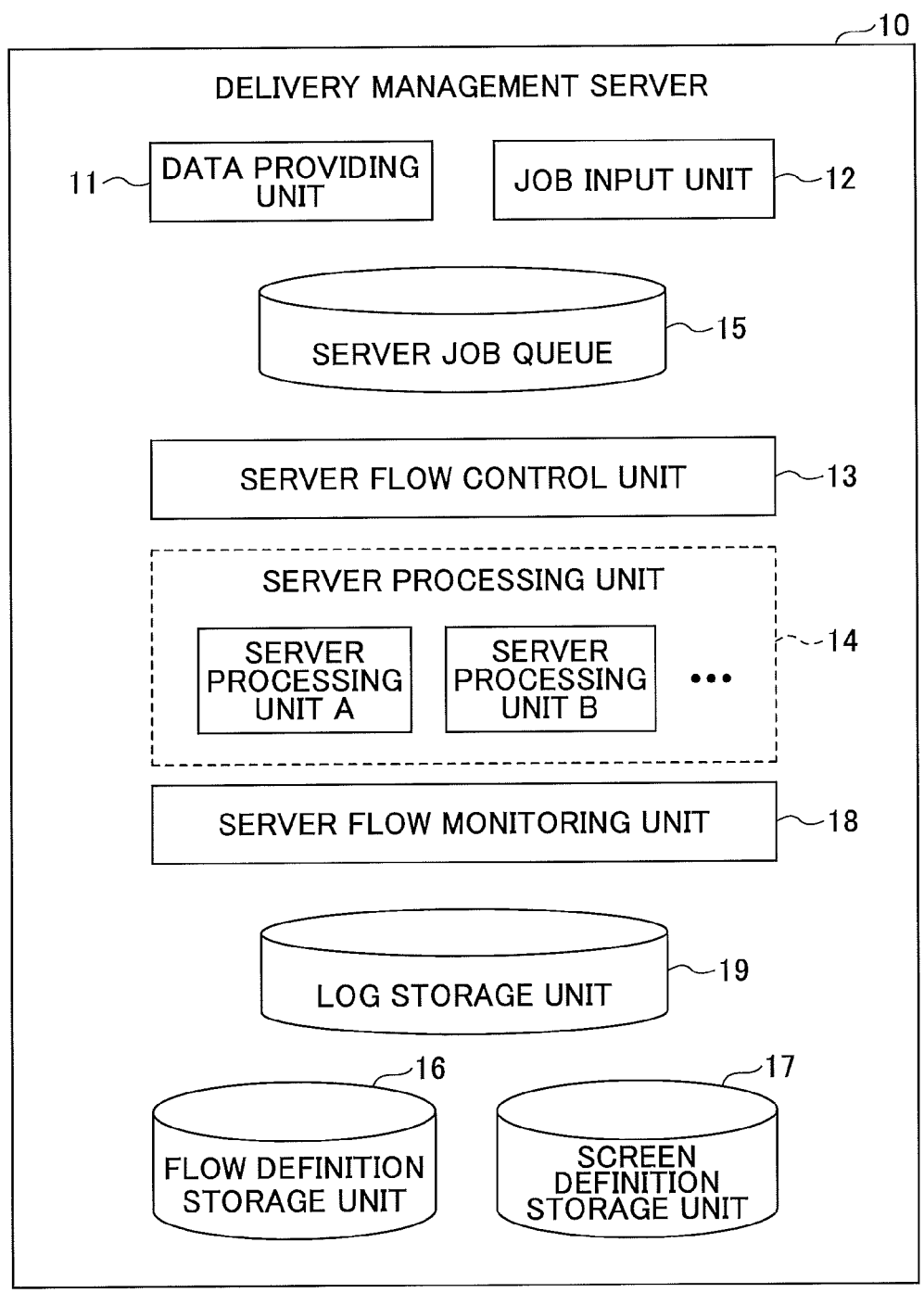
FIG. 14 illustrates an exemplary functional configuration of a delivery management server according to a fourth embodiment of the present invention.

FIG. 14 illustrates an exemplary functional configuration of a delivery management server according to the fourth embodiment. In FIG. 14, the delivery management server 10 further includes a server, flow monitoring unit 18 and a log storage unit 19.

The server flow monitoring unit 18 monitors the progress of the workflow control process executed by the server flow control unit 13 and stores log information indicating the progress of the workflow in the log storage unit 19. Note that the server flow monitoring unit 18 may be implemented by the CPU 104 executing a relevant program installed in the delivery management server 10, for example. The log storage unit 19 may be implemented using the secondary storage unit 102 or a storage device connected to the delivery management server 10 via a network, for example.

Figure 15:
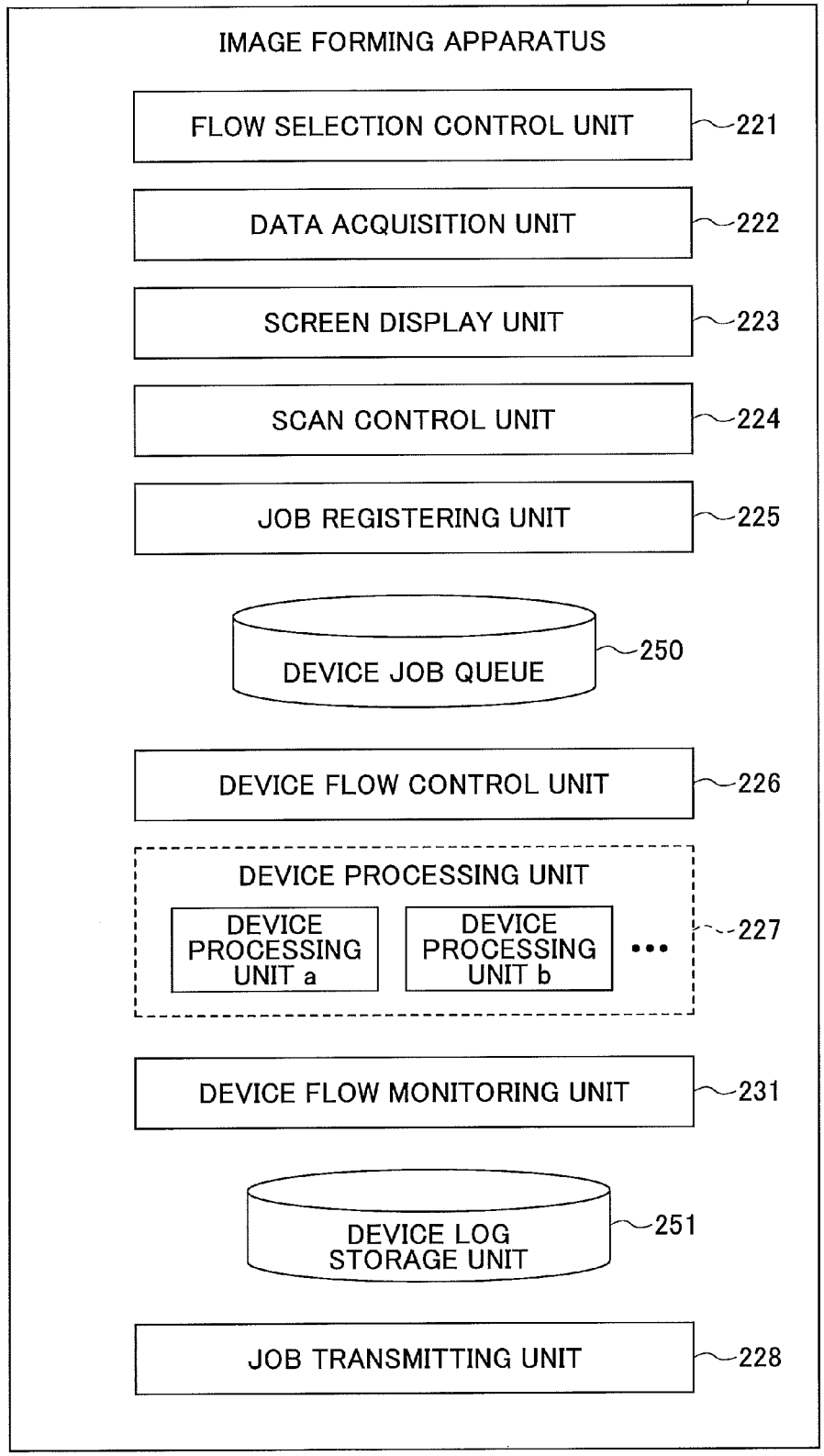
FIG. 15 illustrates an exemplary functional configuration of an image forming apparatus according to the fourth embodiment.

FIG. 15 illustrates an exemplary functional configuration of an image forming apparatus according to the fourth embodiment. In FIG. 15, the image forming apparatus 20 further includes a device flow monitoring unit 231 and a device log storage unit 251.

The device flow monitoring unit 231 monitors the progress of the workflow control process executed by the device flow control unit 226 and stores log information indicating the progress of the workflow in the device log storage unit 251. Note that the device flow monitoring unit 231 may be implemented by the CPU 211 executing a relevant program installed in the image forming apparatus 20, for example. The device log storage unit 251 may be implemented using the HDD 214 or a storage device such connected to the image forming apparatus 20 via a network, for example.

Figure 16:
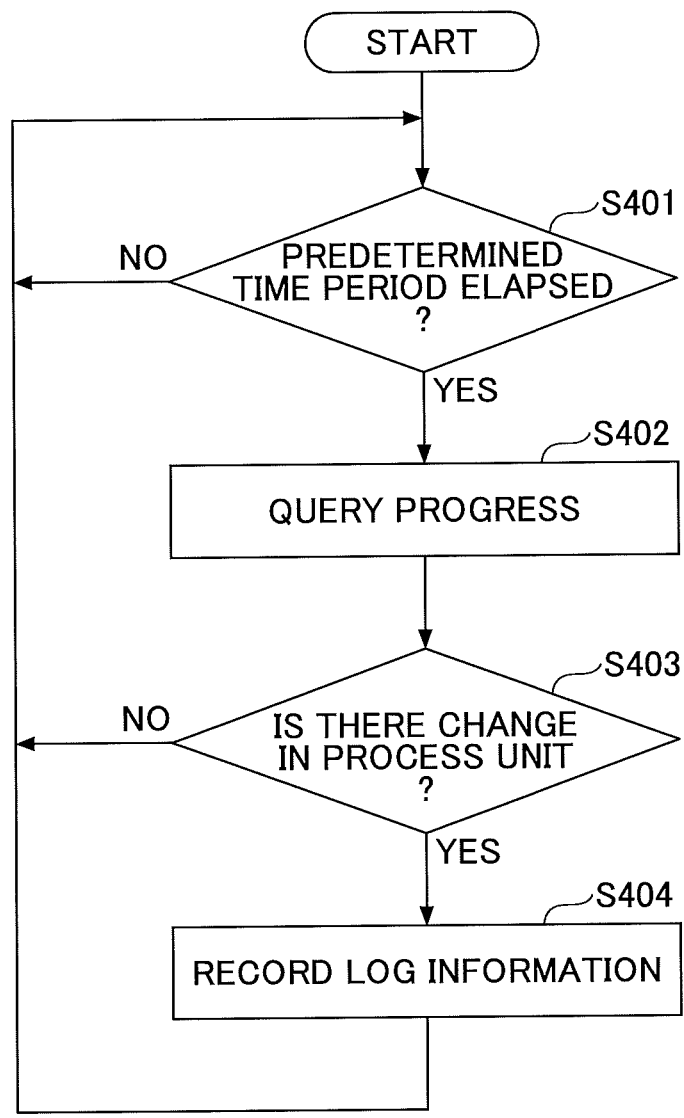
FIG. 16 is a flowchart illustrating exemplary process steps executed by a device flow monitoring unit according to the fourth embodiment.

FIG. 16 is a flowchart illustrating exemplary process steps that may be executed by the device flow monitoring unit 231 according to the fourth embodiment.

When the execution of the target flow is initiated by the device flow control unit 226, the device flow monitoring unit 231 sends a query to the device flow control unit 226 at predetermined time intervals, for example, to inquire about the progress of the target flow (steps S401 and S402). Upon receiving such a query, the device flow control unit 226 may return a response including the login user name, the flow ID, the job ID, and the plugin ID of the process unit currently being executed, for example.

When the plugin ID included in the response is different from the plugin ID included in a previous response to a previous query (YES in step S403), the device flow monitoring unit 231 may store log information including such information in the response in the device log storage unit 251 (step S404). Thus, the device log storage unit 251 may accumulate log information for each process unit that is executed at the image forming apparatus 20. Note that in some embodiments, the log information may include a value indicating the current date and time, for example.

In some embodiments, the log information stored in the device log storage unit 251 may be transmitted to the delivery management server 10 along with job information by the job transmitting unit 228 in step S120 of FIG. 6, for example. In other embodiments, the log information stored in the device log storage unit 251 may be transmitted to the delivery management server 10 separately from the job information. In either case, job information and log information for the same job are preferably transmitted to the delivery management server 10 in a manner such that the job information and the log information are properly associated with each other.

The server flow monitoring unit 18 of the delivery management server 10 executes the process steps as illustrated in FIG. 16 with respect to the server flow control unit 13. In this case, log information associated with job information of a job that is currently executed by the server flow control unit 13 may be additionally stored as new log information in the log storage unit 19. In this way, the delivery management server 10 may be able to centrally manage the overall job progress of a workflow even when a part of the process units constituting the workflow is executed at the image forming apparatus 20, for example.

Note that log information may be recorded by the device flow control unit 226 or the server flow control unit 13 each time the execution of one process unit is completed, for example. Also, in some embodiments, the fourth embodiment may be combined with the second embodiment and/or the third embodiment, for example.

Note that in the above embodiments, an exemplary case is described where input data for the workflow corresponds to a scanned image. However, the present invention is not limited to such a case, and in other examples, image data captured by a digital camera, data stored in a predetermined folder of a mobile terminal or a PC, or data uploaded via a Web page may be the input data for the workflow, for example. In such a case, the device that is to cooperatively execute a workflow with the delivery management server 10 is not limited to the image forming apparatus 20. That is, in some embodiments, other devices such as a digital camera, a mobile terminal, or a PC, for example, may be arranged to execute a part of the process units constituting a workflow.

Note that the image forming apparatus 20 of the above embodiments is an example of a device of the present invention. The delivery management server 10 is an example of an information processing apparatus of the present invention. The flow definition data is an example of data including definition information of a set of process units and information indicating a process unit executed at the device. The scanned image is an example of data generated by the device. The flow selection control unit 221 is an example of an accepting unit. The device flow control unit 226 is an example of a first process control unit. The job transmitting unit 228 is an example of a transmitting unit. The job input unit 12 is an example of a receiving unit. The server flow control unit 13 is an example of a second process control unit. The state query unit 229 is an example of a query unit. The transmission determination unit 230 is an example of a determination unit. The device flow monitoring unit 231 is an example of a recording unit.

Although the present invention has been described above with reference to certain preferred embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU and the RAM may operate as a physical memory or a primary memory of the apparatus, while the HDD may operate as a secondary memory of the apparatus.

The present application is based on and claims the benefit of priority of Japanese Patent Application No. 2014-001022 filed on Jan. 7, 2014, the entire contents of which are hereby incorporated by reference.

What is claimed is:

1. An information processing system comprising:
   a device; and
   an information processing apparatus that is connected to the device via a network;
   wherein the device includes
      a memory; and
      a processor that implements processes of:
         accepting an execution request for executing a set of a plurality of processes with respect to data generated by the device, an execution order of the set of the plurality of processes being included in and stored as definition information;
         controlling execution of at least one process of the plurality of processes based on the definition information; and
         transmitting to the information processing apparatus an execution result of the process executed by the processor and process unit information that identifies the process executed at the device and that indicates the execution status of each process included in the set of the plurality of processes; and
   wherein the information processing apparatus includes
      a memory; and
      a processor that implements processes of:
         receiving the execution result of the process and the information identifying the process executed at the device; and
         identifying a process of the plurality of process that has not been executed at the device based on the received process unit information, and controlling execution of the identified process with respect to the execution status indicated in the received process unit information.

2. The information processing system as claimed in claim 1, wherein
   the processor of the device further implements a process of:
   making a query regarding a state of the information processing apparatus; and
   changing the process of the plurality of processes to be controlled by the processor of the device depending on an obtained query result.

3. The information processing system as claimed in claim 1, wherein
   the processor of the device further implements processes of:
      determining whether the data generated by the device is subject to processing by a process of the plurality of processes that is not executed at the device; and
      transmitting the data generated by the device to the information processing apparatus when the processor determines that the data is subject to processing by the process that is not executed at the device.

4. The information processing system as claimed in claim 1, wherein
   the processor of the device further implements processes of:
      recording progress information relating to a progress of execution control of the process by the processor of the device; and
      transmitting the progress information to the information processing apparatus.

5. An information processing method implemented by a device and an information processing apparatus that is connected to the device via a network, the information processing method comprising:
   accepting an execution request for executing a set of a plurality of processes with respect to data generated by the device, an execution order of the set of the plurality of processes being included in and stored as definition information;
   controlling execution of at least one process of the plurality of processes based on the definition information;
   transmitting an execution result of the executed process and process unit information that identifies the executed process and that indicates the execution status of each process included in the set of the plurality of processes to the information processing apparatus;
   receiving, at the information processing apparatus, the execution result of the process and the information identifying the process executed at the device; and
   identifying, at the information processing apparatus, a process of the plurality of processes that has not been executed at the device based on the received process unit information, and controlling, at the information processing apparatus, execution of the identified process with respect to the execution status indicated in the received process unit information.

6. The information processing method as claimed in claim 5, further comprising:
   making a query, by the device, regarding a state of the information processing apparatus;
   wherein in controlling execution of the at least one process, the device changes the process of the plurality of processes that is to be controlled depending on an obtained query result.

7. The information processing method as claimed in claim 5, further comprising:
   determining, by the device, whether the data generated by the device is subject to processing by a process of the plurality of processes that is not executed at the device;
   wherein in transmitting the execution result and the information identifying the executed process, the device transmits the data generated by the device to the information processing apparatus when it is determined that the data is subject to processing by the process that is not executed at the device.

8. The information processing method as claimed in claim 5, further comprising:
   recording, by the device, progress information relating to a progress of the controlled execution of the process by the processor of the device;
   wherein the device transmits the progress information to the information processing apparatus.

9. The information processing system as claimed in claim 1, wherein the processor of the device further implements processes of:
   identifying processes of the plurality of processes that are to be executed by the processor of the device by determining, for each process, whether the device is specified as a value of an executing location included in the definition information.

10. The information processing system as claimed in claim 1, wherein
the processor of one of the device or the information processing apparatus is further configured to dynamically control and change a previously set up executing location of a process depending on a processing load of either the device or the information processing apparatus.

11. The information processing system as claimed in claim 1, further comprising a plurality of the devices, wherein each device is designated with respect to a process to be executed, and wherein each device determines whether to execute a designated process itself based on the definition information.

12. The information processing system as claimed in claim 1, wherein
the processor of the device is further configured to determine whether only a part of the data generated at the device is sent to the information processing apparatus.

\* \* \* \* \*